Feb. 2, 1965 — C. H. KAVANAGH — 3,168,151
CULTIVATOR RAKE
Filed May 29, 1961
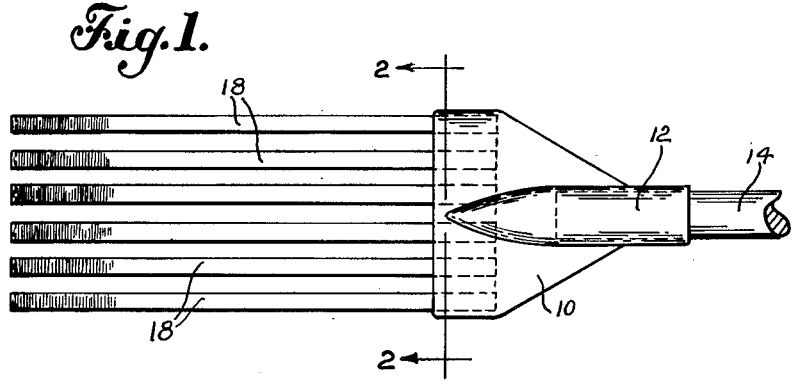
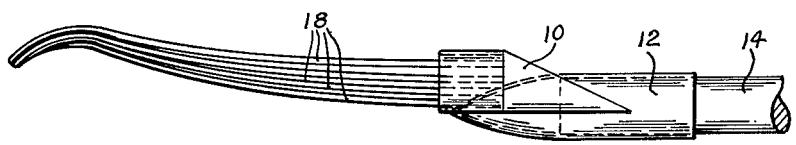
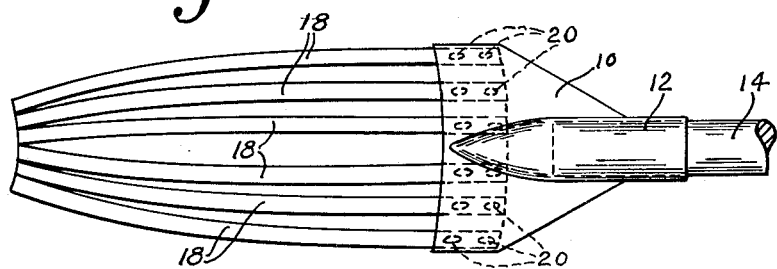
INVENTOR.
Charles H. Kavanagh
BY Harold E. Cole
Attorney

United States Patent Office 3,168,151
Patented Feb. 2, 1965

3,168,151
CULTIVATOR RAKE
Charles H. Kavanagh, Waltham, Mass., assignor to
Lewis C. Lillibridge, Waltham, Mass.
Filed May 29, 1961, Ser. No. 113,470
3 Claims. (Cl. 172—372)

This invention relates generally to a cultivator rake which is a combination of a rake, a cultivator of earth and a mover of earth, small objects, stones and weeds.

More specifically, this invention makes possible a novel use in which, with downward pressure on the handle, the rake tines come together and in this position will cultivate earth, move earth, and remove small objects and stones.

It is, therefore, the object of this invention to provide many useful functions; to rake, to move and cultivate earth, to cultivate around small plants without injury to the roots, to remove weeds with its digging action.

With the novel and unique inverted curve on the body of the rake, applying downward pressure causes the tines to close together, thus becoming useful as a digging tool, cultivating tool, a mover of earth, small stones and debris.

Some of the advantages of this cultivator-rake are: Most rakes have a tendency to spread when pressure is applied, thus becoming ineffective in moving wet leaves, stones or earth. With this rake, when pressure is applied the tines come closer together and there is more strength and resistance to a stone or any obstruction to be removed.

Besides being a valuable leaf rake, it is true to its name of cultivator-rake as it is very useful in a vegetable garden. One can by putting downward pressure on the rake bring more earth up to a plant. It is also safer to use around young plants than a hoe. It is also useful in a rock garden.

In the drawing:

FIG. 1 is a top plan view of my rake in normal position, the handle being shown broken away.

FIG. 2 is an enlarged, sectional view taken on the line 2—2 of FIG. 1.

FIG. 3 is a side elevational view of my rake, showing the position of the tines when pressure downwardly has been applied to the handle.

FIG. 4 is a top plan view thereof, otherwise similar to FIG. 3.

As illustrated, my rake has the usual base or tine support 10 having a concave upper surface between opposite sides thereof, in position of use, as illustrated in said FIG. 2. The usual hollow neck or sleeve 12 is attached to said base and receives a well-known handle 14 which is shown broken away.

Said base 10 has an elongate slot 16 extending crosswise into which tines 18 enter and are welded as at 20 to said base. Said tines extend well beyond said base and are normally spaced laterally apart as shown in said FIG. 1. At their outer ends they extend in a downward direction as shown in said FIG. 3.

When pressure is applied to said tines by bearing downwardly upon the handle, while the tines are on the ground or other firm surface, they are moved closer to each other at their outer ends. In this position they provide a blade at their outer ends as shown in said FIGS. 3 and 4, and thus my rake may serve as a hoe or cultivator.

The base may be made of steel in one piece and the tines of spring steel that can be spot welded to the base.

I claim:

1. A rake comprising a handle, a base connected to said handle, and flexible tines connected to said base and extending beyond and having portions extending angularly in a downward direction, said base having a concave upper surface between opposite sides thereof transversely of the handle in position of use, said tines being connected to said base in positions whereby a line drawn across their face surfaces forms an arc corresponding to the concave upper surface of said base and being of a length so as to terminate approximately in the same plane when downward pressure is applied to said handle.

2. A rake comprising a handle, a base connected to said handle, and flexible tines connected to said base and extending beyond and having portions extending in a downward direction, said base having a concave upper surface between opposite sides thereof transversely of the handle in position of use, said tines normally extending substantially parallel to each other and being connected to said base in positions whereby a line drawn across their face surfaces forms an arc corresponding to the concave upper surface of said base and being of a length so as to terminate approximately in the same plane when downward pressure is applied to said handle.

3. A rake comprising a handle, a base connected to said handle, and flexible tines connected to said base and extending beyond and having portions extending in a downward direction, said base having a concave upper surface between opposite sides thereof transversely of the handle in position of use, said tines being connected to said base in positions whereby a line drawn across their face surfaces forms an arc corresponding to the concave upper surface of said base and being of a length so as to terminate approximately in the same plane when downward pressure is applied to said handle, said tines between the base and the extremities of the downward extending portions being free of mutual interconnecting means.

References Cited by the Examiner
UNITED STATES PATENTS

| | | | |
|---|---|---|---|
| 1,706,507 | 3/29 | Withington | 172—378 |
| 1,909,754 | 5/33 | Carlson | 56—400.17 |
| 2,032,954 | 3/36 | Reichard | 56—400.18 |
| 2,481,442 | 9/49 | Paul | 56—400.17 |

T. GRAHAM CRAVER, *Primary Examiner.*